(12) United States Patent
Maas (10) Patent No.: US 10,177,459 B2
(45) Date of Patent: Jan. 8, 2019

(54) DUAL-BAND MODULAR ACTIVE ANTENNA

(71) Applicant: THALES, Courbevoie (FR)

(72) Inventor: Olivier Maas, Gif sur Yvette (FR)

(73) Assignee: THALES, Courbevoie (FR)

( * ) Notice: Subject to any disclaimer, the term of this patent is extended or adjusted under 35 U.S.C. 154(b) by 111 days.

(21) Appl. No.: 15/371,030

(22) Filed: Dec. 6, 2016

(65) Prior Publication Data

US 2017/0170563 A1 Jun. 15, 2017

(30) Foreign Application Priority Data

Dec. 9, 2015 (FR) ...................................... 15 02558

(51) Int. Cl.
| | | |
|---|---|---|
| *H01Q 21/00* | (2006.01) | |
| *H01Q 5/42* | (2015.01) | |
| *H01Q 21/06* | (2006.01) | |
| *G01S 13/78* | (2006.01) | |
| *G01S 13/87* | (2006.01) | |

(52) U.S. Cl.
CPC ........... *H01Q 21/0006* (2013.01); *H01Q 5/42* (2015.01); *H01Q 21/061* (2013.01); *G01S 13/78* (2013.01); *G01S 13/872* (2013.01)

(58) Field of Classification Search
CPC ............ H01Q 1/523; H01Q 5/40; H01Q 5/42; H01Q 21/0006; H01Q 21/0025; H01Q 21/0061; H01Q 21/0062; H01Q 21/0064; H01Q 21/0065

See application file for complete search history.

(56) References Cited

U.S. PATENT DOCUMENTS

| 5,214,436 A | 5/1993 | Hannan | |
|---|---|---|---|
| 5,485,167 A * | 1/1996 | Wong | ................... H01Q 21/062 343/753 |
| 6,054,953 A | 4/2000 | Lindmark | |
| 6,452,549 B1 | 9/2002 | Lo | |
| 2011/0316734 A1 | 12/2011 | Svensson | |

FOREIGN PATENT DOCUMENTS

| FR | 2 960 347 A1 | 11/2011 |
|---|---|---|
| FR | 2 987 175 A1 | 8/2013 |

OTHER PUBLICATIONS

S. E. Valavan et al., "A Dual Band Quasi-Magneto-Electric Patch Antenna for X-band Phased Array," Proceedings of the 44th European Microwave Conference, Oct. 6-9, 2014, pp. 378-381.

* cited by examiner

*Primary Examiner* — Robert Karacsony
(74) *Attorney, Agent, or Firm* — Baker & Hostetler LLP (57) ABSTRACT

A dual-band antenna panel comprises a plurality of dual-band radiating cells operating independently for a first frequency in a first frequency band and a second frequency in a second frequency band, the first frequency band being higher than the second frequency band, each of the radiating cells exhibiting a distinct feed to the first and to the second frequency. The antenna panel comprises radiating cells disposed according to a mesh dimensioned with respect to the first frequency band, and wherein the feeds to the second frequency of the radiating cells are clustered in packets within combiners having a single feed.

12 Claims, 7 Drawing Sheets

DUAL-BAND MODULAR ACTIVE ANTENNA

CROSS-REFERENCE TO RELATED APPLICATIONS

This application claims priority to foreign French patent application No. FR 1502558, filed on Dec. 9, 2015, the disclosure of which is incorporated by reference in its entirety.

FIELD OF THE INVENTION

The present invention lies in the field of radiating devices designed to operate in two distinct frequency bands. It applies notably to the electronic-scanning antennas used by electronic scanning radars for airspace monitoring. These radars generally operate in the S band and in the band dedicated to IFF applications (the acronym standing for "Interrogation Friend or Foe"), and use hardware components employing printed technology board (also known as microstrip).

BACKGROUND

Electronic scanning radars of the prior art consist of directional antennas produced on the basis of radiating elements, or radiating cells, assembled within an array. Modification of the amplitude and of the phase of each of the radiating elements of the array makes it possible to steer the direction of the radar beam.

The frequencies of interest for aerial monitoring applications are the S band, used for the primary radar, and in particular the sub-band from 2.9 GHz to 3.3 GHz, as well as frequency bands of a few MHz or tens of MHz situated around the frequencies 1.03 GHz and 1.09 GHz, and used for IFF applications. Current radar equipment, whether they be ground-based radars or radars onboard a carrier such as for example a vehicle, a ship or an aeroplane, generally comprise two independent systems: a rotating directional antenna dedicated to IFF applications and an array of radiating cells for the S Band radar. The rotating antenna is positioned above or alongside the S band radar antenna. The two volumes are therefore added, and this may pose a problem when transporting or installing the antennas.

The technical problem posed therefore consists in implementing, within a single radiating aperture, two distinct radiating arrays operating in different frequency bands, in particular the S band and the band dedicated to IFF applications. The arrays must each have distinct feed points enabling each of its radiating elements to be controlled independently in phase (and optionally in amplitude), and thus enabling each of the radar beams to be pointed independently.

Solutions, detailed subsequently, such as those represented in FIGS. 1a and 1b, making it possible to produce a dual-band radiating array, are known from the prior art. These solutions consist in inserting, into a mesh designed for the elements dedicated to the highest frequency band, elements dedicated to the lowest frequency band according to a mesh specific to these frequencies, either by disposing them at regular intervals between the elements of the high mesh (FIG. 1a), or by overlaying them on these elements (FIG. 1b).

Though these solutions address the problem of the footprint of the array, they are not optimal in terms of performance. Indeed, the radiating elements of the array at the high frequency do not all evolve in the same environment, some being more disturbed than others by the presence of the elements of the array at the low frequency, thereby generating non-regular disturbances prejudicial to the proper operation of the radar.

The invention addresses the problem posed by describing an active antenna panel whose radiating face comprises dual-band radiating cells, disposed according to a mesh specific to the highest frequency band. The radiating elements specific to each frequency band of which these cells are composed then all operate in the same environment, thus avoiding disturbances related to heterogeneous interference on the elements of the array. There is then an excess of cell radiating elements associated with the lowest frequency band. To prevent this excess from giving rise to additional cost in respect of the radio modules required for signal transmission and reception, the antenna panel comprises a second layer in which an array of combiners is implemented. The pathways associated with the low frequency are grouped into packets by the combiners, so as to recreate a mesh close to the mesh adapted to the low frequency band. These combiners also make it possible to limit the number of feeds to the low-band hardware components, in such a way that the interface with the existing transmission and reception modules of the radar does not require any adaptations.

SUMMARY OF THE INVENTION

In order to solve this technical problem, a dual-band antenna panel comprising a plurality of dual-band radiating cells, each of these cells operating independently for a first frequency in a first frequency band and a second frequency in a second frequency band, the first frequency band being higher than the second frequency band, is described here. The radiating cells of which the antenna panel is composed exhibit a distinct feed to the first and to the second frequency, and are disposed according to a mesh dimensioned with respect to the first frequency band, the feeds to the second frequency of the radiating cells being bundled by packets within combiners each having a single feed.

Advantageously, the radiating cells comprise a radiating element which is dimensioned so as to radiate in the first frequency band and is associated with an element filtering the second frequency band, and a radiating element which is dimensioned so as to radiate in the second frequency band and is associated with an element filtering the first frequency band.

Advantageously, all the radiating cells are identical.

In a preferential embodiment of the dual-band antenna panel according to the invention, each mesh of the radiating panel has a size substantially equal to $\lambda_H/2$, $\lambda_H$ being a wavelength associated with the maximum frequency of the first frequency band.

In one embodiment of the dual-band antenna panel according to the invention, the number of feeds to the second frequency of the radiating cells bundled within a combiner is an integer close to the ratio of the first frequency to the second frequency.

In another embodiment of the dual-band antenna panel according to the invention, the number of clustered feeds to the second frequency of the radiating cells within a combiner is an integer substantially equal to the power of two which is closest to the ratio of the first frequency to the second frequency.

Advantageously, the clustered feeds to the second frequency of the radiating cells within a combiner are adjacent feeds forming regular polygons.

In one embodiment of the dual-band antenna panel according to the invention, the dual-band antenna panel is a multilayer circuit comprising:

an upper face comprising the plurality of radiating cells,
  an internal layer comprising an array of combiners linked to feeds to the second frequency band of the radiating cells,
  a rear face comprising an array of connectors,
  lines linking the feed to each of the combiners of the array of combiners to a connector associated with the second frequency band of the array of connectors, and
  lines linking the feed to the first frequency band of the radiating cells to a connector associated with the first frequency band of the array of connectors.

In one embodiment of the dual-band antenna panel according to the invention, the first frequency band comprises the 2.9 GHz-3.3 GHz band, and the second frequency band is centred around a frequency chosen from among the frequency 1030 MHz and the frequency 1090 MHz.

In another embodiment of the dual-band antenna panel according to the invention, the first frequency band comprises the 2.9 GHz-3.3 GHz band, and the second frequency band comprises at least the frequency 1030 MHz and the frequency 1090 MHz.

The invention also consists of a dual-band structure for housing an antenna panel. This structure is characterized in that it is configured to house a dual-band antenna panel according to one of the preceding claims, and in that it comprises a plurality of transmit receive modules associated with the first frequency band, and a plurality of transmit receive modules associated with the second frequency band.

Finally, the invention is concerned with a dual-band radar antenna characterized in that it comprises a dual-band antenna panel such as described above, and a dual-band housing structure such as described above, the said dual-band housing structure being linked to the said antenna panel.

BRIEF DESCRIPTION OF THE DRAWINGS

The invention will be better understood and other characteristics and advantages will become better apparent on reading the nonlimiting description which follows, and by virtue of the appended figures, among which.

DETAILED DESCRIPTION

It is presented in such a way as to address the need required by ground and naval radar applications, and accordingly is concerned with the problematic issue of the joint use of a primary radar in the S band, and more particularly in the 2.9 GHz-3.3 GHz sub-band, and of an IFF secondary radar, aimed in particular at working around the frequencies 1.03 GHz and 1.09 GHz. However, the invention applies in an identical manner whatever applications and frequency bands are envisaged, by accordingly adapting the mesh of the various antenna arrays to the frequency bands.

In a radiating array used to undertake electronic scanning in two dimensions, each radiating element occupies a surface called a radiating mesh, whose spacing is approximately $\lambda/2$, with $\lambda$ the maximum frequency of the frequency band envisaged.

Figure 1A:
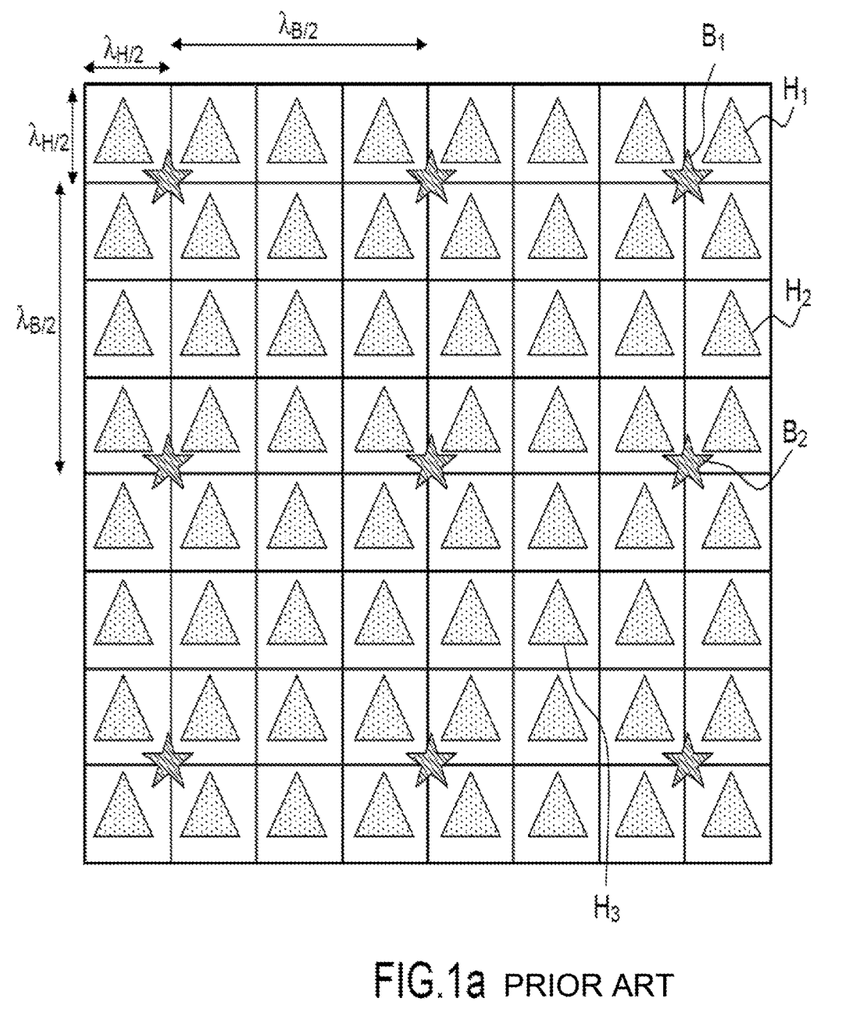
FIGS. 1a and 1b present various meshes of a radiating array according to the prior art.
Figure 1B:
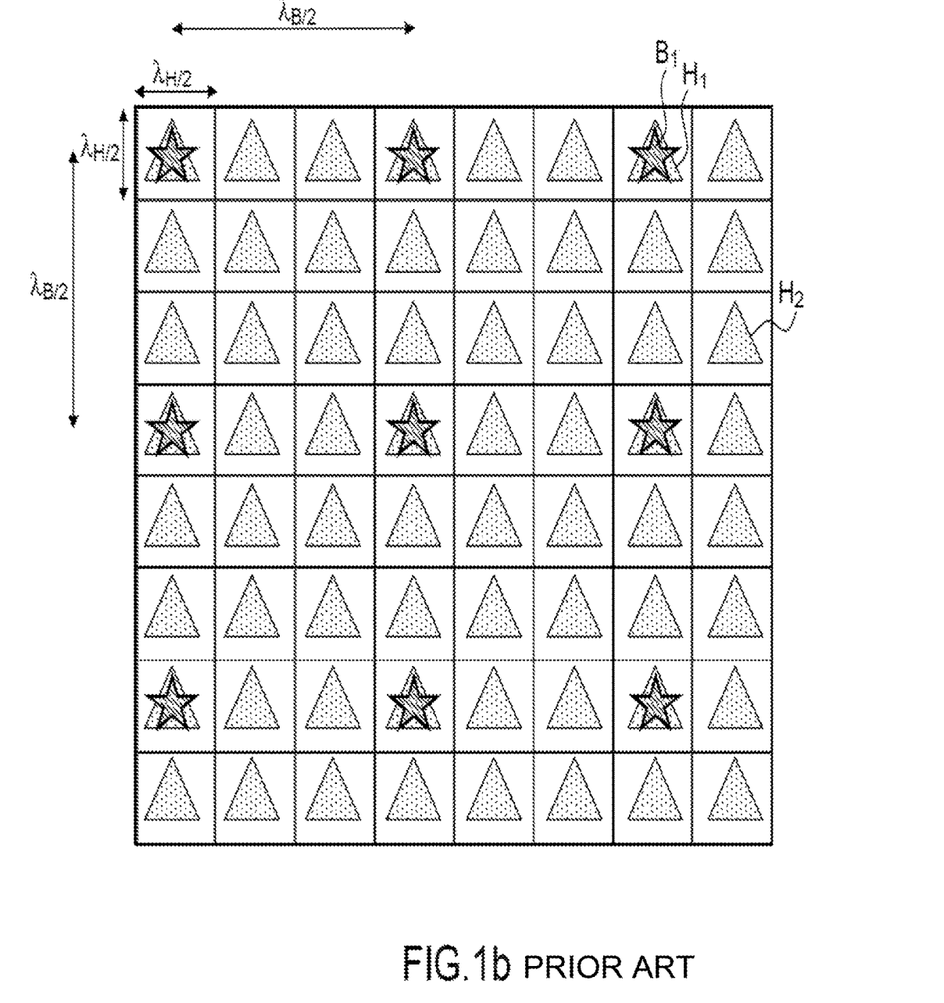

FIG. 1a presents the mesh of a radiating array according to the prior art. The active antenna of the primary radar, which evolves at the highest frequency, consists of elements H radiating at the high frequency and disposed according to a mesh adapted to this frequency band, the mesh then having dimensions close to $\lambda_H/2 \times \lambda_H/2$, with $\lambda_H$ the wavelength associated with the maximum frequency of the high frequency band. Each of the radiating elements H can be driven in phase, and if necessary in amplitude, so as to direct the radiation pattern of the antenna in the desired direction. The electrical efficiency of the power pathways, the size of the radiating elements and the size of the radiating mesh of the array are then optimized for the high frequency band.

The radiating array consisting of the radiating elements operating at the high frequency forms the tightest mesh, into which will be inserted elements B, radiating in the low frequency band. They are disposed at regular intervals according to a second radiating mesh, having dimensions close to $\lambda_B/2 \times \lambda_B/2$, with $\lambda_B$ the wavelength associated with the maximum frequency of the low frequency band. In the proposed example, the ratio of the low frequency band to the high frequency band is three. The elements of the second mesh are then interleaved with the elements of the first mesh according to a spacing three times as large ($\lambda_B = 3 \cdot \lambda_H$). In FIG. 1a, the radiating elements in the low frequency band are represented as having sizes comparable to those of the radiating elements in the high frequency band. As a general rule, these low-band elements are of a more significant size than the high-band elements, in a proportion related to the ratio of the frequency bands. However, representing them on the basis of identical sizes simplifies the understanding of the physical phenomena.

The consequence of the interleaving between the elements radiating in the high frequency band and the elements radiating in the low frequency band is that the former then no longer all evolve in the same environment. Indeed, the element $H_1$ is in direct proximity to the element $B_1$. It will therefore be greatly affected by the phenomena of coupling with this element. The element $H_2$ is further from the radiating element in the closest low frequency band ($B_2$). It will therefore be less affected by the coupling phenomena. The same holds for $H_3$, which is at a significant, and equal, distance from four elements radiating in the low frequency band. The array of elements associated with the high frequency band then comprises radiating elements that are more or less disturbed than others by the presence of the elements of low frequency, as a function of their position. The closer the band ratio between the two operating frequencies is to an odd integer, the more significant the coupling phenomena. Indeed, the elements radiating at the low frequency are dimensioned with respect to the wavelength, $\lambda_B$. But, as $\lambda_B/2 \approx 3 \cdot \lambda_H/2$, these elements then also radiate for the wavelength of the high frequency band, thereby amplifying the coupling phenomena.

These disturbances, accentuated by the regularity of the construction of the arrays, give rise to upswings in lobes in the radiation pattern of the array at the high frequency. The upswings are different for each of the radiating elements as a function of its position, they are then difficult to remove by calibration and pre-compensation. This defect is prejudicial to the proper operation of the high-band radar, whose performance is degraded with respect to the performance obtained when the two radars are dissociated.

FIG. 1b presents another embodiment of a radiating array mesh according to the prior art. In a manner identical to FIG. 1a, all the elements are represented as having the same size for the sake of simplification. In contradistinction to FIG. 1a, the elements radiating at the low frequency band are no longer disposed between the nodes of the array, but overlaid on the nodes of the array radiating at the high frequency.

In this embodiment, certain nodes of the array radiating at the high frequency are occupied by a high-frequency element ($H_2$) only, while others are occupied by a high-frequency element ($H_1$) on which is overlaid a low-frequency element ($B_1$). Once again, the regularity of the disturbance introduced by the presence of the low-frequency radiating elements will degrade the radiation of the high-frequency array, and be manifested by upswings in lobes in the radiation pattern and a decrease in the performance of the radar.

The invention proposes to solve the above-stated problems by using dual-band radiating cells, operating in two distinct frequency bands. These radiating cells comprise elements radiating in each of the frequency bands, and a distinct feed to each of these elements, the said feed being associated with means for filtering the disturbances generated by the coupling related to the proximity of the elements.

Figure 2A:
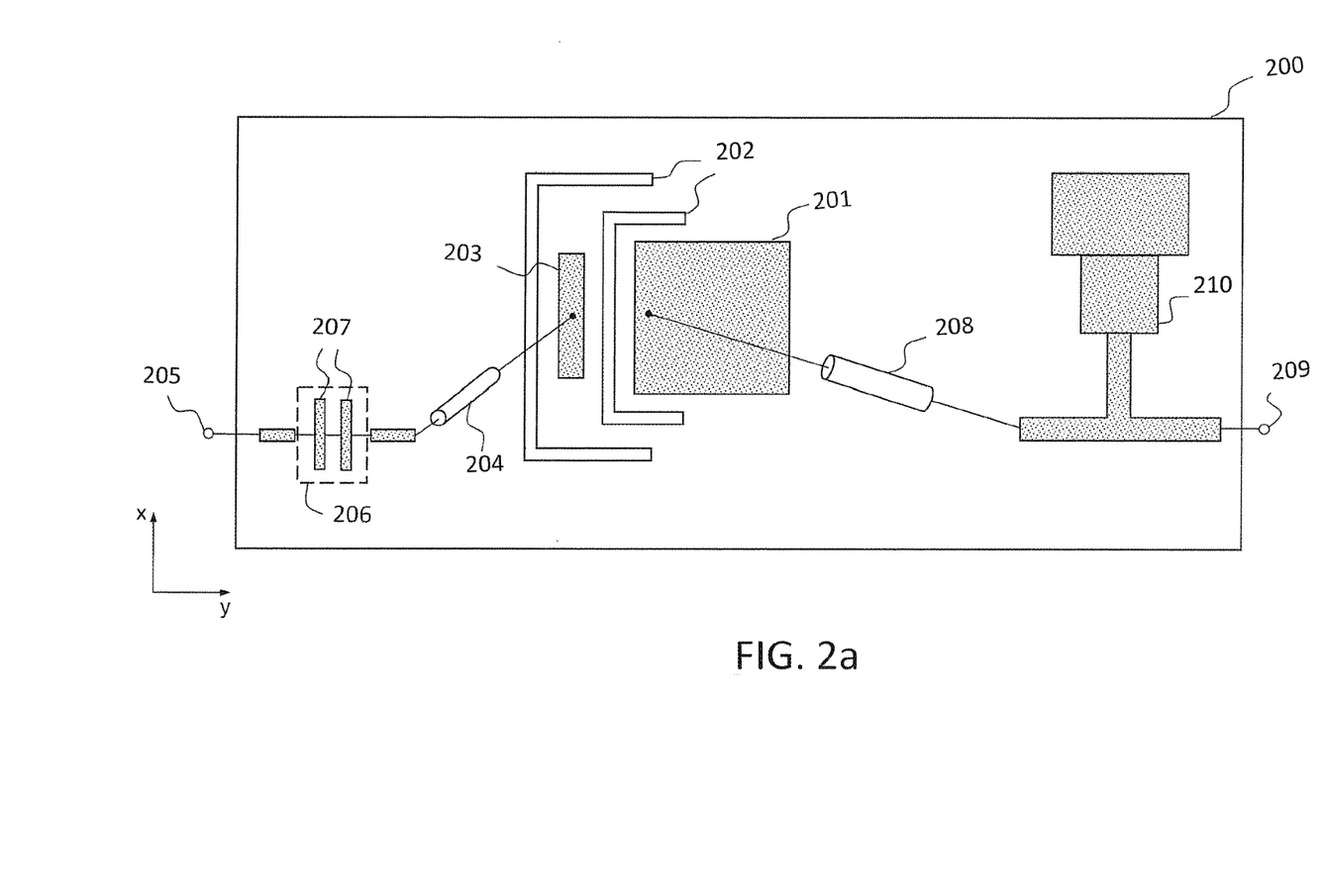
FIGS. 2a and 2b present various embodiments of a dual-band radiating cell making it possible to implement the invention.

FIG. 2a presents a dual-band radiating cell operating simultaneously in the 2.9 GHz-3.3 GHz band, and in the IFF band, for which operation is optimal around the frequencies 1030 MHz and 1090 MHz.

This radiating cell 200, or antenna with printed radiating elements, is a printed circuit comprising multiple layers separated by a dielectric substrate, using distributed elements, that is to say microstrip lines. This technology is very widespread for microwave frequencies since, for the high frequencies, the manipulation of waves on the basis of waveguides is simpler than the manipulation of currents and voltages. One of the layers of the printed circuit forms a ground plane.

The radiating cell comprises a radiating element 201 of patch type. In distributed elements, a patch is a square- or rectangular-shaped powered metallized layer. The dimensions of the patch are chosen so that it radiates in the high frequency band (S band). It is positioned in one of the layers of the circuit.

The radiating cell also comprises two folded radiating slots 202. These slots behave like dipoles, while being less sensitive to coupling phenomena. They are tuned to operate in the vicinity of the sub-bands of interest of the low frequency band (in the example, 1030 MHz and 1090 MHz). This tuning is achieved by dimensioning them with respect to the wavelength sought, the slot then having a length of $\lambda/2$. The number of slots is adapted to the number of desired low frequency bands. The use of two slots folded into a U and of a patch antenna makes it possible to accommodate the three radiating elements in a very restricted environment.

The slots are produced by partial de-metallization of the ground plane of the cell. The excitation of the slots is produced by a radiating strip 203 positioned between the two slots in one of the planes of the printed circuit, preferably the plane adjacent to the ground plane, and linked to the power supply of the slots. The relative positioning of the two slots 202 and of the exciter 203 creates phenomena of couplings, both between the elements of the low frequency band, and also with the patch 201. Their positioning must therefore be adjusted so as to push the artefacts generated by this coupling out of the useful bands. Adjusting the gap between the slots makes it possible to adjust the resonant frequency of each slot and to push their operation back to the triple frequency outside of the high frequency band.

The exciter 203 is powered by the low frequency band feed 205, to which it is linked by a coaxial line 204 and a low-pass filter 206.

This low-pass filter comprises, for example, two capacitors 207, which in printed technology take the form of open line segments. The role of the filter is the filtering of the components of the high frequency band that are due to the strong coupling between the slots and the patch.

The radiating element of patch type 201 is powered by the high frequency band feed 209 to which it is linked by a coaxial line 208 and a filter 210.

The role of the filter 210 is the filtering of the components of the low frequency band that are due to the strong coupling between the slots and the patch.

The production of a high-pass or bandpass filter requires that series capacitors and parallel inductors be strung together, this being difficult to achieve with distributed technology, and wherein the size of the hardware components related to the low frequency band presents the problem of footprint. An alternative way of producing a bandpass filter then consists in inserting one or more short-circuited parallel waveguides, better known as a stub.

A parallel waveguide plays the role of series resonator circuit, and exhibits a very reduced footprint. Its length is proportional to the wavelength in the dielectric of the frequency that it short-circuits. Thus, a stub produced on the basis of a microstrip line segment of length $\lambda_B/4$, with $\lambda_B$ the wavelength of the low frequency band, will play the role of short-circuit in its resonance band. In the example, this is the low frequency band. However, resonant structures based on lines operate naturally in the same manner at the frequency $f_0$ and for all odd multiples of this frequency. Such is the case in the example, where the ratio of the frequency bands is 3. Thus, such a stub will also play the role of short-circuit for the high frequency band.

This problem is solved by implementing a stub whose total length is split up into several segments of different impedances (known by the term "stepped impedance") that can vary. Such a stub is dispersive. It is dimensioned so as to exhibit a short-circuit on its fundamental frequency, and an open circuit on its triple frequency. The filter 210 of FIG. 2a exhibits such a stub, consisting of several segments of microstrip line of different widths, and therefore exhibiting several distinct impedances. In the example, it exhibits three different impedances, but the number of segments is a parameter specific to each implementation. On account of the variable impedances, the system is not homogeneous, its electrical length no longer depends linearly on the frequency. Its size being $\lambda_B/4$, it is tuned so as to block the components in the low frequency band, but is no longer adapted to the electrical length $3.\lambda_H/4$. It then does indeed carry out the sought-after functions of filtering the components of the low frequency band while allowing through the components of the high frequency band.

The various elements constituting the cell are disposed in various layers of the printed circuit, the slots being able to be positioned in the ground plane.

Figure 2B:
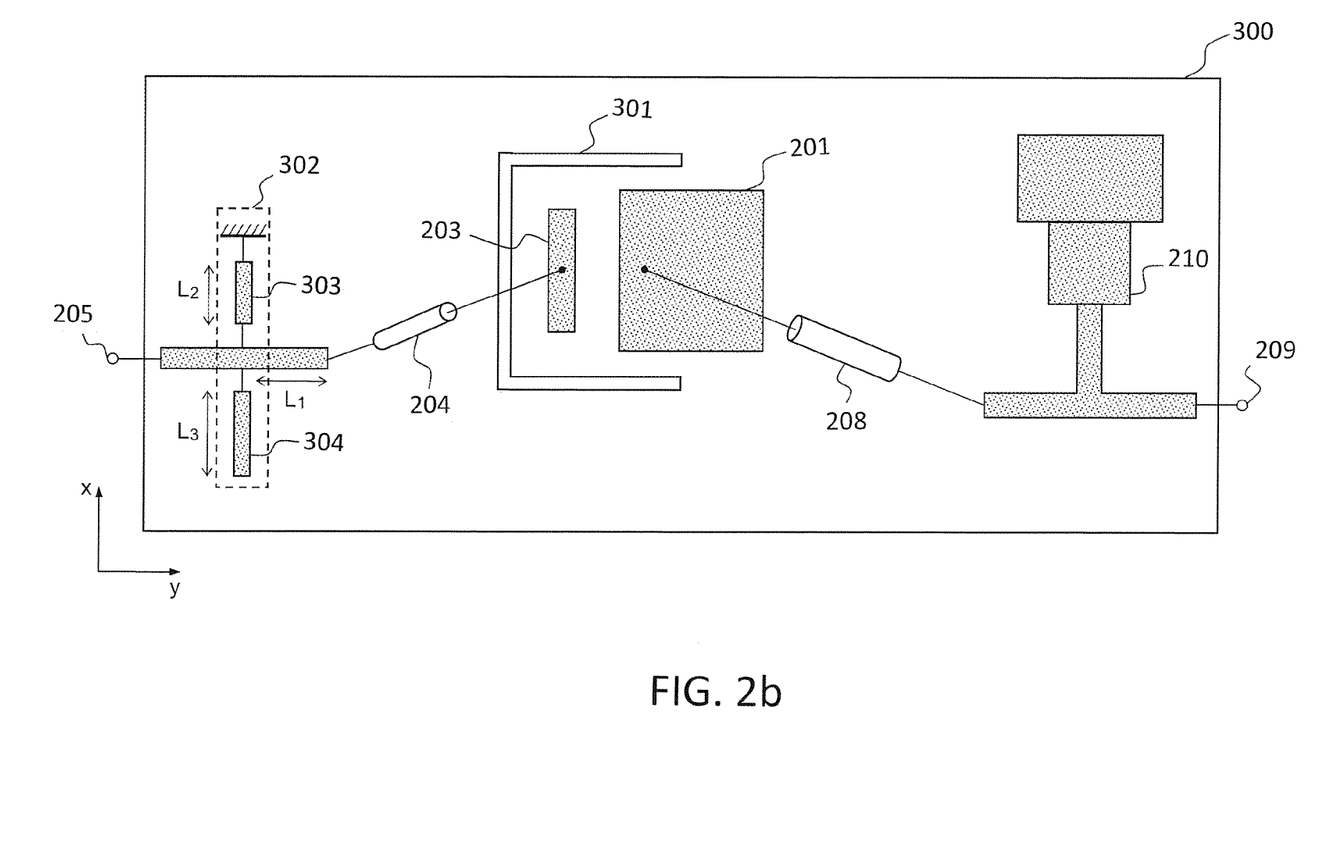

A variant embodiment of the radiating cell is represented in FIG. 2b. In this variant, the number of sub-bands in the low frequency band is limited to two.

In a manner identical to what is presented for FIG. 2a, the radiating cell 300 comprises a radiating element 201 of patch type tuned to the upper frequency band. This radiating element is powered by the high band output 209 to which it is linked by way of a coaxial line 208 allowing it to pass through the various layers of the printed circuit, and of a filter 210 produced in the form of a stub exhibiting several segments of variable impedance, making it possible to filter the low frequency band while being passing for the high frequency band. Advantageously, a second element of patch type, identical to the first, can be overlaid on the first element of patch type 201, so as to widen the passband in the high frequency band.

The principal difference between this cell and that presented previously consists in that it contains only a single element of slot type 301, folded into a U, and positioned so as to be unencumbered with respect to the masking that the patch or patches 201 represent. The operating band of this element is then widened to the whole of the low frequency band, so as to comprise the two sub-bands required by IFF applications, by the association of a resonator 302. The radiating slot, which forms a parallel resonator, can be supplemented with a series resonator placed in the output plane, or by a parallel resonator placed a quarter-wave further away. The resonator 302 is then placed at a distance $L_1$ from the connector 204 linking it to the exciter 203 of the slot, $L_1$ being equal to $\lambda/4$, where $\lambda$ is the central wavelength of the low frequency band.

The slot 301 is not tuned to one of the sub-bands of the low frequency band, but to the central frequency, i.e. in the case of the chosen example, the frequency 1.06 GHz. The resonator 302 is also designed to resonate at this central frequency. The action on the coupling between these two elements, that is to say the mismatch created between these two elements, will make them resonate around the sought-after frequencies. The coupling between the two elements is adjusted by varying the position of the exciter 203 of the slot. The slot 301, the resonator circuit 302 and the exciter 203 are therefore dimensioned and positioned so that the whole resonates around the frequencies 1030 MHz and 1090 MHz, while permitting a large mismatch in the intermediate frequency zone. The radiating element thus obtained is dual-frequency. This approach offers the advantage of introducing only a single radiating slot into the cell, and of reducing the interference between the slot and the patch, and therefore the coupling phenomena in the low frequency band and the high frequency band. The positioning of the slot 301 and of the exciter 203 is therefore simplified with respect to the element presented in FIG. 2a.

In FIG. 2b, the resonator circuit 302 is of parallel capacitor and inductor type. The inductor 303 is of low value. It is produced in the form of a grounded microstrip line of length $L_2$. The capacitor 304 is produced in the form of a short-circuited microstrip line of length $L_3$, $L_3$ being much greater than $L_2$.

Advantageously, a low-pass filter similar to the filter 206 represented in FIG. 2a can be added so as to filter the components of the high bands related to the coupling between the slot and the patch. Such a filter is however not indispensable, the resonator circuit carrying out naturally the role of low-pass filter.

In this example, the decrease in the number of radiating elements (slots) is compensated by an additional effort on the slot-matching microwave frequency circuit.

Other embodiments of such a radiating cell, which are adapted to other frequency bands, are possible, such as for example that described in the article "A dual band quasi-magneto-electric patch antenna for X-band Phased array", by S. E. Valavan et al., Proceedings of the 44th European Microwave Conference, October 2014. In this article, a dual-band radiating cell is produced by associating a patch antenna for the high frequency band and a U-shaped folded slot etched in the metallization of the patch for the low frequency band.

The use of these cells in a structure such as that presented in FIG. 1b, alternating with elements specific to the high frequency band, does not solve the problem of the interference generated by the non-homogeneity of the array, the dual-band radiating element not having exactly the same characteristics (gain, radiation pattern) in the high band as the radiating element specific to the high band.

Figure 3:
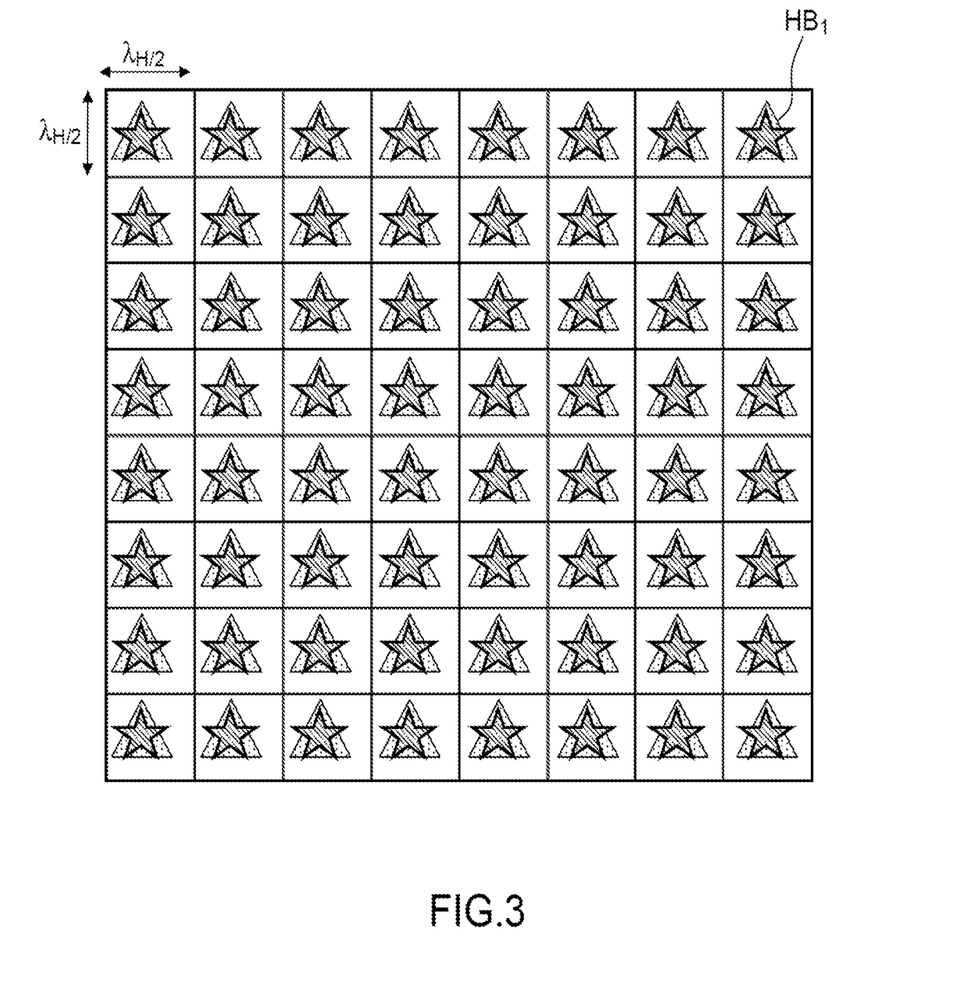
FIG. 3 presents the mesh of a radiating array according to a first embodiment of the invention.

The invention then proposes to modify the distribution of the radiating cells. FIG. 3 presents the mesh of a radiating array according to a first embodiment of the invention, in which the mesh is dimensioned with respect to the high frequency (close to $\lambda_H/2 \times \lambda_H/2$), and which is composed solely of dual-band radiating cells ($HB_1$) exhibiting a distinct feed to each of the frequency bands.

Such an array does not exhibit any defect of periodicity between the low-band elements and the high-band elements, for the following reasons:

it does not mix high-band elements and low-band elements, but uses a single dual-band element, thus removing the problems of coupling between elements, the disposition of the dual-band cells in the radiating array is uniform. Each radiating cell, whatever its operating frequency, always sees the same environment (except on the edges of the array).

The invention therefore consists of a radiating panel having a radiating face consisting of a single array of dual-band radiating cells whose spacing is adjusted with respect to the maximum frequency. This spacing is optimal for the high frequency, but over-optimal for the low frequency which is then oversampled. This over-sampling translates into an increase in the amount of radio equipment to be implemented in order to carry out the radar processings, and gives rise to investment whose cost may be penalizing and to incompatibility with existing equipment.

To remedy this problem, one of the aspects of the proposed solution consists in adding an array of combiners, whose role is to group in phase a number N of feeds to the low frequency of the radiating cells so as to reconstruct an equivalent element of larger surface area, and in connecting this pathway formed to a low-frequency transmission/reception module. Therefore, at the output of each radiating cell there is a direct connection to a high-band transmission/reception module, and a connection to a combiner which is itself linked to a low-band transmission/reception module. The combiner can be compared to a coupler or a summator in one sense, and to a divider in the other sense.

The number of low-frequency transmission/reception modules can be optimal by choosing combiners whose number of pathways is equal to the ratio of the high frequency to the low frequency, or by default, of the maximum frequency of the high frequency band to the maximum frequency of the low frequency band.

Figure 4A:
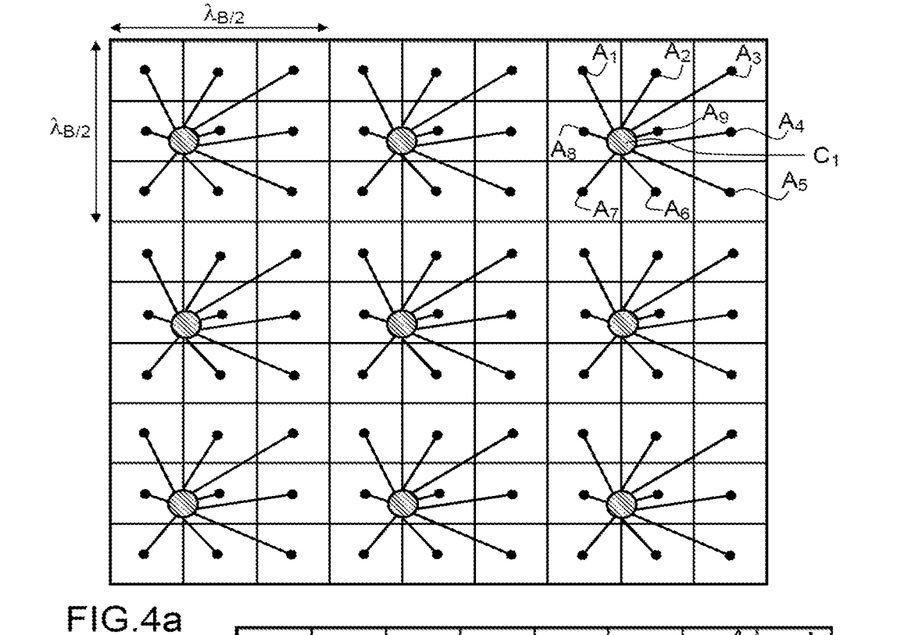
FIGS. 4a and 4b present various embodiments of an array of combiners according to the invention.

FIG. 4a presents an embodiment of an array of combiners according to the invention, appropriate to the need for distinct operation in the S band and in the band dedicated to IFF applications. In this case, the frequency ratio between the high band and the low band is equal to nine. The feeds to the low frequency band of the radiating cells are clustered in packets of nine adjacent feeds $A_1$ to $A_9$ within a combiner $C_1$ exhibiting a single feed, so as to define a new mesh whose dimensions are those of the mesh adapted to the high frequency band. The low-frequency equivalent radiating element thus reconstructed covers a mesh of close to $\lambda_B/2 \times \lambda_B/2$.

The elements associated with the high band and with the low band have a gain which equals at the maximum $4*\pi*S_{meshcell}/\lambda^2$, $S_{meshcell}$ being here the area of the mesh associated with the high frequency band. Therefore, the element associated with the high frequency band possesses a nominal gain of around 5 dB, while the equivalent radiating element associated with the low frequency band possesses a gain which is reduced by a ratio of 9, i.e. a gain of the order of −4.5 dB.

Note that the mesh is not necessarily square in shape, it can take a triangular or hexagonal shape, for example.

In the example, the combiners are disposed at the level of the geometric centre of the equivalent element, but the position of these combiners is free, as long as the link between the combiners (for example C1) and the various feeds to the low frequency band of the radiating cells that they serve (for example A1 to A9) is achieved by lines whose size is identical, so as not to introduce any phase shifts between the various feeds.

The invention applies in an identical manner when the ratio of the high frequency to the low frequency is not an integer. In this case, the combiner used is then chosen to be an N-to-1 combiner, for which N is an integer close to the ratio of the frequencies, and preferably smaller than this ratio. In an advantageous manner, N can also be a power of 2 which is close to the ratio of the frequencies, preferably immediately smaller, thus rendering the combiner compatible with most commercial combiners, or an array of cascaded 2-to-1 combiners.

The performance of the radiating panel according to the invention is optimal at low frequency when the number N of low-frequency feeds of radiating cells, grouped in phase within the combiners, is equal to the ratio of the high frequency to the low frequency. A certain variation around this optimal value is possible without the performance being overly affected thereby. However, having a number N of grouped feeds that is greater than twice the ratio of the frequencies and less than half the ratio of the frequencies should be avoided.

The organization of the groupings of the feeds to the low frequency of the radiating cells is not necessarily carried out according to a square. It can be adjusted, as a function of the shape of the radiating panel, of the ratio of the frequency bands, or of each radar's specific scanning domain constraint. The chosen shape can then be any polygon (rectangle, triangle, star), or other shape, regularly distributed over the surface of the radiating panel.

Figure 4B:
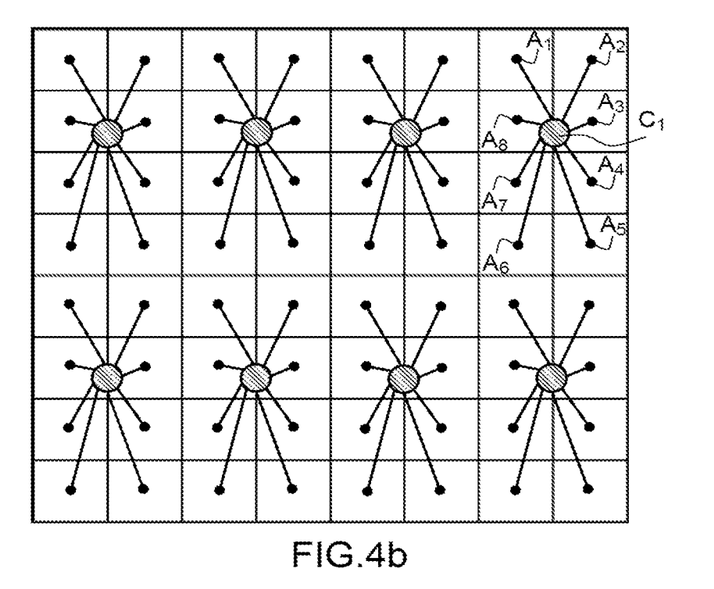

FIG. 4b presents a second embodiment of an array of combiners according to the invention, in which the feeds to the low frequency of the radiating elements are clustered in packets of eight feeds $A_1$ to $A_8$ in a combiner of size 8 to 1, eight being the power of two which is closest to the ratio of the frequency bands. The feeds are clustered in adjacent feed rectangles, of length 4 and width 2. Alternatively, the inputs can be grouped together within three stages of cascaded 2-to-1 combiners.

A radar using such a radiating panel has an array which is slightly oversampled in the horizontal plane, and slightly undersampled in the vertical plane, with respect to the optimal case presented in FIG. 4a. Thus, the angular width in which the radar can scan is increased in the horizontal plane, and reduced in the vertical plane. This manner of operation is adapted for certain applications, such as for example IFF applications, for which the angular zone traversed by the radar in the horizontal plane is more significant than that traversed in the vertical plane.

The antenna panel according to the invention can advantageously take the form of a multilayer microwave-frequency circuit, comprising:
 a radiating upper face, in which dual-band radiating cells are distributed according to a mesh adapted to operate at the high frequency,
 an internal layer composed of microwave-frequency combiners covering the whole of the surface of the radiating face, each combiner being linked to the feed to the low frequency of at least one radiating cell of the upper face,
 a rear face in the form of a panel of connectors making it possible to convey the signals between the feeds to the high frequency of each of the radiating cells or the feeds of the array of combiners, and the right of the connectors of packages of the radar equipment.

The rear face of the conductor panel makes it possible to organize the disposition of the feeds to the various meshes of the antenna panel, so as to render them compatible with the interface with the various radio equipment to which it is linked. This face therefore comprises connectors associated with the high frequency band and linked by lines, etched on one of the layers of the multilayer circuit making up the radiating panel, to the various feeds to the low band of each of the radiating cells. It also comprises connectors associated with the low frequency band, linked by lines etched on one of the layers of the multilayer circuit making up the radiating panel to the feeds to the various combiners of the array of combiners.

The length of the lines is tailored, so as not to generate phase shifts between the feeds.

The invention thus allows coexistence between two radiating arrays within one and the same antenna panel, without one array disturbing the other. It also allows the interfaces of this antennal panel to be devised so as to allow easy connection with the transmission/reception modules in the high frequency band and in the low frequency band of the radars.

The microwave-frequency part of the radars generally takes the form of housing structures, or racks, which are carrier mechanical structures comprising inter alia a power supply and that will be connected to the rear of the antennal panel. Into these housing structures are inserted packages, or boards, each containing a plurality of transmission/reception modules. Each of the transmission/reception modules is itself connected to a different input/output of the antennal panel.

The use of packages, comprising a limited number of modules, makes it possible to simplify the production, installation and maintenance of the equipment. The packages are standardized elements, which in the event of a fault can be replaced without requiring the replacement of the whole of the housing structure. They offer flexibility on account of their capacity for reuse, and make it possible to reduce radar manufacturing and utilization costs.

In the current state of the art, the housing structures and the packages of which they are composed are singled out with respect to the frequency band in which they operate. Their dimensions, and the number of pathways that they group together are dependent on their operating frequency band.

Figure 5:
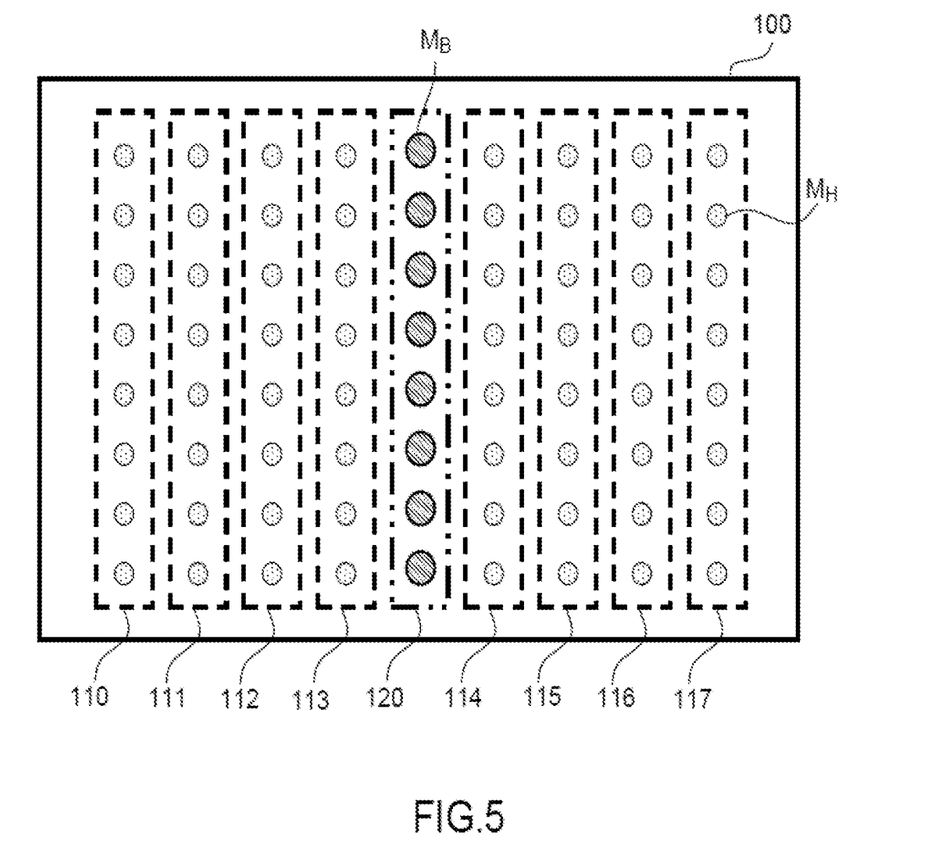
FIG. 5 presents an exemplary housing structure associated with an embodiment of an antenna according to the invention.

The invention also then comprises a dual-band housing structure making it possible to drive the dual-band antennal panel described above, jointly bearing embedded packages dedicated to high-frequency-band operation and packages dedicated to low-frequency-band operation. FIG. 5 presents an exemplary housing structure associated with an embodiment of an antenna according to the invention.

In FIG. 5, the housing structure 100 comprises a plurality of packages 110 to 117 associated with high-frequency-band operation. Each of these packages comprises transmission/reception modules $M_H$ intended to be linked to the various feeds to the high-frequency mesh of the antenna.

It also comprises one or more packages 120 associated with low-frequency-band operation. Each of these packages comprises transmission/reception modules $M_B$ intended to be linked to the combiners of the low-frequency mesh of the antenna.

Thus, the modules $M_H$ can feed and drive the high-frequency elements of each of the radiating cells of the panel. The modules $M_B$ can feed and drive the array of combiners and therefore groups of feeds to the low frequency of the radiating cells of the panel.

Finally, the invention comprises a radar antenna using a dual-band antenna panel comprising a single radiating surface according to the invention, linked to a dual-band housing structure comprising packages integrating transmit receive modules hooked up to radiating elements of each of the frequency bands.

The invention therefore makes it possible to accommodate two radiating arrays operating at different frequencies in one and the same radiating surface, while solving the phenomena of upswings in lobes related to the periodicity of the elements of the array. The integration of the radiating panel according to the invention into existing radar equipment requires just a few modifications. According to the configuration given to the antenna panel's rear face, the latter can be linked to two distinct housing structures such as the existing ones, or linked to one and the same dual-band housing structure, produced by inserting into one and the same housing structure pre-existing modular packages dedicated to one and the other of the operating frequency bands.

The invention claimed is:

1. A dual-band antenna panel comprising a plurality of dual-band radiating cells, each of the cells operating independently for a first frequency in a first frequency band and a second frequency in a second frequency band, the first frequency band being higher than the second frequency band, each of the said radiating cells exhibiting a distinct feed to the first and to the second frequency, the antenna panel wherein the radiating cells are disposed according to a mesh dimensioned with respect to the first frequency band, and wherein the feeds to the second frequency of the radiating cells are clustered in packets within combiners each having a single feed.

2. The dual-band antenna panel according to claim 1, wherein the said radiating cells comprise a radiating element which is dimensioned so as to radiate in the first frequency band and is associated with an element filtering the second frequency band, and a radiating element which is dimensioned so as to radiate in the second frequency band and is associated with an element filtering the first frequency band.

3. The dual-band antenna panel according to claim 1, wherein all the radiating cells are identical.

4. The dual-band antenna panel according to claim 1, wherein each mesh of the radiating panel has a size substantially equal to $\lambda_H/2$, $\lambda_H$ being a wavelength associated with the maximum frequency of the first frequency band.

5. The dual-band antenna panel according to claim 1, wherein the number of clustered feeds to the second frequency of the radiating cells within a combiner is an integer close to the ratio of the first frequency to the second frequency.

6. The dual-band antenna panel according to claim 1, wherein the number of clustered feeds to the second frequency of the radiating cells within a combiner is an integer substantially equal to the power of two which is closest to the ratio of the first frequency to the second frequency.

7. The dual-band antenna panel according to claim 1, wherein the clustered feeds to the second frequency of the radiating cells within a combiner are adjacent feeds forming regular polygons.

8. The dual-band antenna panel according to claim 1, the said dual-band antenna panel being a multilayer circuit comprising:
an upper face comprising the plurality of radiating cells,
an internal layer comprising an array of combiners linked to feeds to the second frequency band of the radiating cells,
a rear face comprising an array of connectors,
lines linking the feed to each of the combiners of the array of combiners to a connector associated with the second frequency band of the array of connectors, and
lines linking the feed to the first frequency band of the radiating cells to a connector associated with the first frequency band of the array of connectors.

9. The dual-band antenna panel according to claim 1, wherein the first frequency band comprises the 2.9 GHz-3.3 GHz band, and the second frequency band is centred around a frequency chosen from among the frequency 1030 MHz and the frequency 1090 MHz.

10. The dual-band antenna panel according to claim 1, wherein the first frequency band comprises the 2.9 GHz-3.3 GHz band, and the second frequency band comprises at least the frequency 1030 MHz and the frequency 1090 MHz.

11. A dual-band structure for housing an antenna panel, wherein it is configured to house a dual-band antenna panel according to claim 1, and comprising a plurality of transmit receive modules associated with the first frequency band, and a plurality of transmit receive modules associated with the second frequency band.

12. A dual-band radar antenna, comprising a dual-band antenna panel according to claim 1, and a dual-band structure for housing an antenna panel, configured to house a dual-band antenna panel according to claim 1, and comprising a plurality of transmit receive modules associated with the first frequency band, and a plurality of transmit receive modules associated with the second frequency band, the said dual-band housing structure being linked to the said antenna panel.

* * * * *